Aug. 24, 1943.  E. B. BOWER  2,327,590

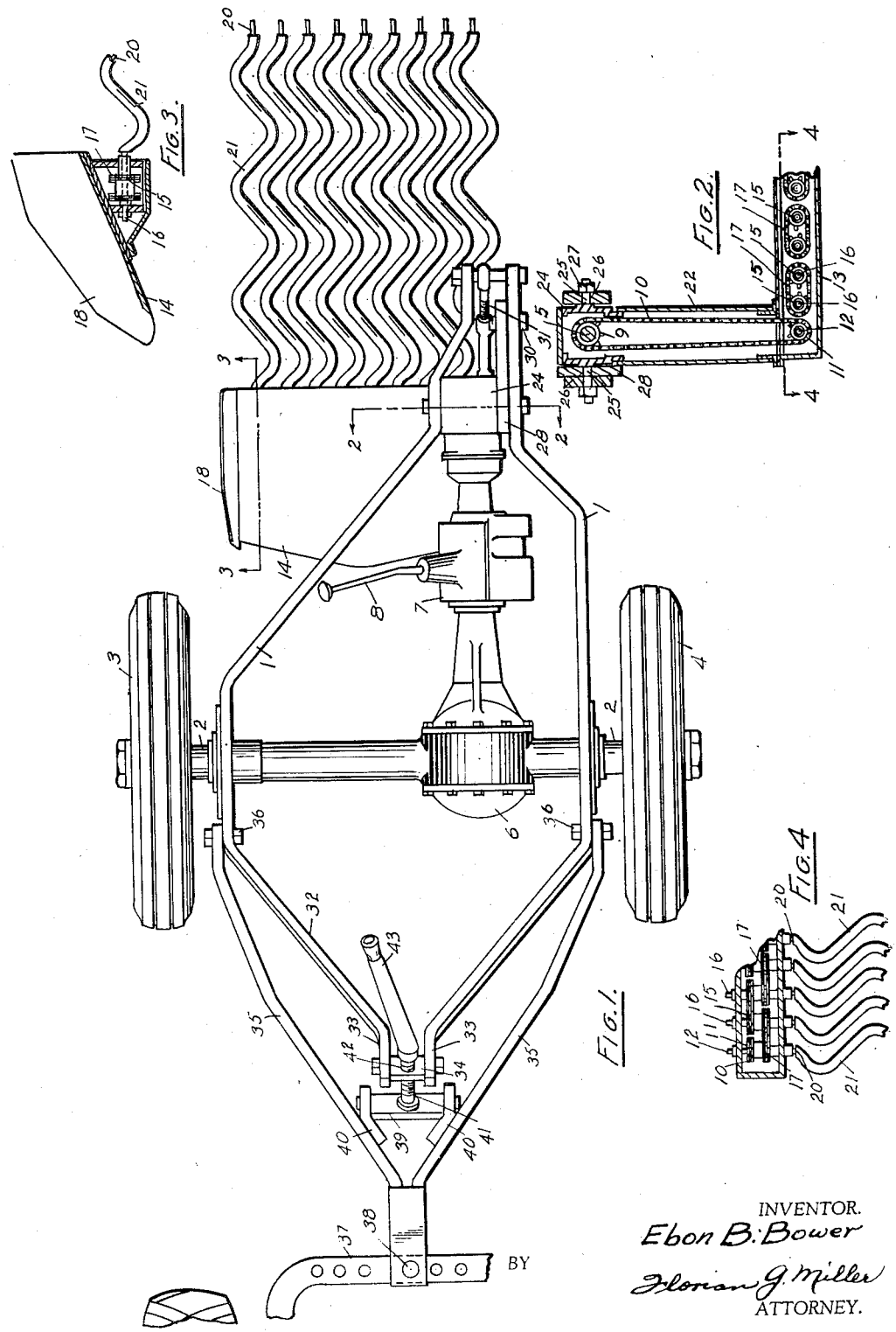

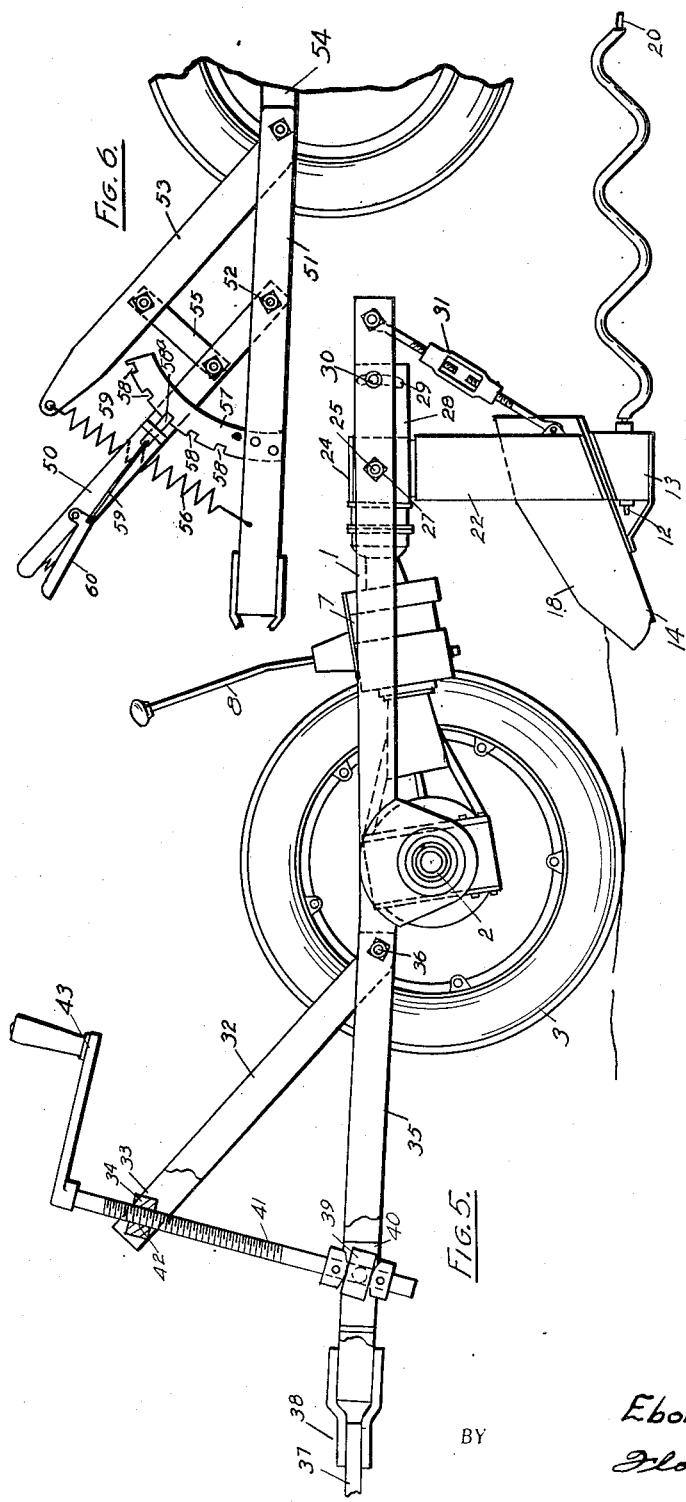

DIGGING MACHINE FOR ROOT CROPS

Filed April 26, 1941   3 Sheets-Sheet 3

INVENTOR.
Ebon B. Bower
BY
Florian J. Miller
Atty.

Patented Aug. 24, 1943

2,327,590

UNITED STATES PATENT OFFICE 2,327,590

DIGGING MACHINE FOR ROOT CROPS

Ebon B. Bower, Bellefonte, Pa.

Application April 26, 1941, Serial No. 390,620

11 Claims. (Cl. 55—54)

This invention relates generally to digging machines for root crops, and more particularly to potato digging machines.

All digging machines for root crops made according to the prior art, and with which I am familiar, have used an inclined revolving track which carried the potatoes to a predetermined height and dropped them at the rear of the digger. This type of machine badly bruises the potatoes and scatters them on the field. The chain or web used in these conventional diggers has always given trouble and caused long delays by having small stones lodge between the rods of the elevating web and drive sprockets and wheels operating same. The breakage of one of these rods causes serious entanglement and breakage. Great amounts of earth are formed on these conventional machines which necessarily greatly increase the pull on the tractor or team drawing them. Many times the potatoes are not separated from the earth and they are buried on the field. In the conventional machine, the gears, chains and other moving parts are not protected, resulting in the fouling thereof, and general inefficient operation of the machine. With the digging blade being forward of the wheels, many of the potatoes are shoved outwardly and sidewardly from the blade and crushed by the wheels of the digger. The conventional machine elevates large stones as well as potatoes, thereby having the damaging feature of dropping such large stones on the potatoes already having been dropped on the ground by the elevating web.

It is, accordingly, an object of my invention to overcome the above and other defects in digging machines for root crops, and it is more particularly an object of my invention to provide a potato digging machine which is simple in construction, economical in manufacture, efficient and simple in operation, and economical in cost.

Another object of my invention is to provide a potato digging machine which has a minimum of draw-bar pull.

Another object of my invention is to provide a potato digging machine which can be operated by one man.

Another object of my invention is to provide a potato digging machine which does not raise the potatoes off of the ground.

Another object of my invention is to provide a potato digging machine wherein the angle of the digging blade with respect to the earth may be varied.

Another object of my invention is to provide a potato digging machine with simple means for raising and lowering the digging blade.

Another object of my invention is to provide open helically wound rods in co-operation with a blade for separating the potatoes from the earth.

Another object of my invention is to provide novel gear means on a potato digging machine for operating open helically wound rods disposed behind the digging blade.

Another object of my invention is to provide enclosed gears, chains and other operating parts in a potato digging machine.

Another object of my invention is to provide open helically wound members, power operated and with means for varying the rotational speed thereof.

Another object of my invention is to provide a potato digging machine wherein the digging blade is disposed to the rear of the wheels of the digger.

Other objects of my invention will become evident from the following detailed description taken in conjunction with the accompanying drawings in which:

Fig. 1 is a plan view of my novel potato digging machine.

Fig. 2 is a view taken on the line 2—2 of Fig. 1.

Fig. 3 is a view taken on the line 3—3 of Fig. 1.

Fig. 4 is a fragmentary view taken on the line 4—4 of Fig. 2.

Fig. 5 is a side elevational view of my novel potato digging machine.

Fig. 6 is a fragmentary side elevational view showing a modified form of handle for raising and lowering the digging blade from the earth.

Figure 7:
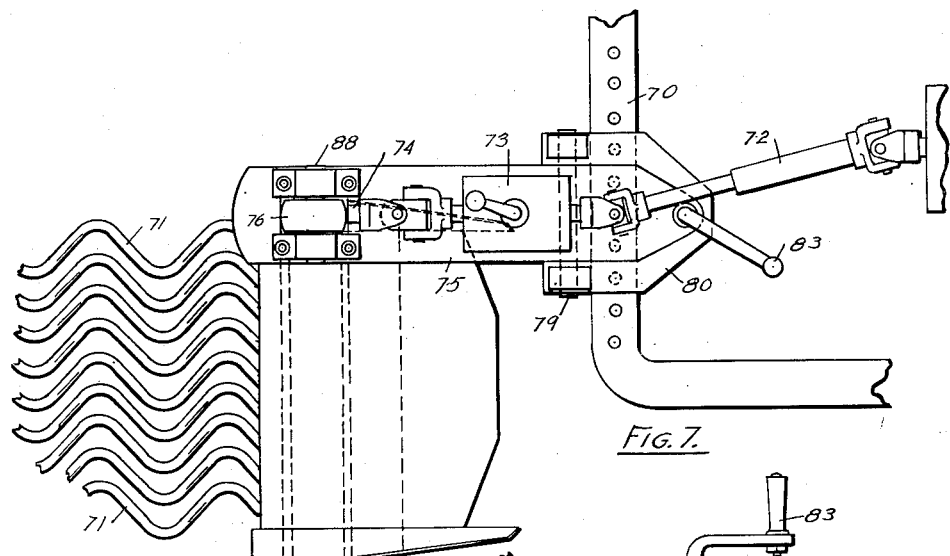
Fig. 7 is a fragmentary plan view of my novel potato digging machine connected directly to a tractor.
Figure 8:
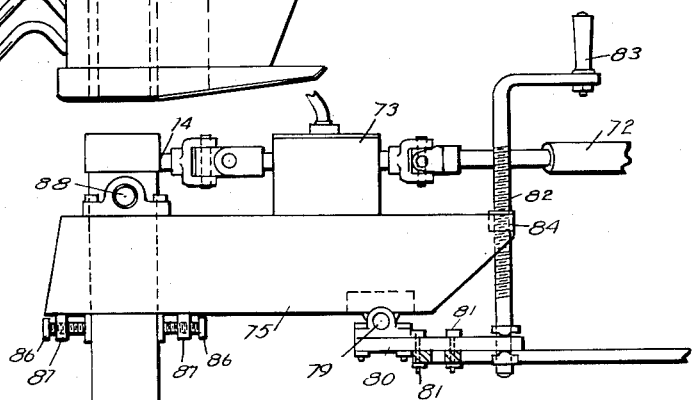
Fig. 8 is a side elevational view of the machine shown in Fig. 7.

Referring to the drawings, Fig. 1 shows a frame 1, pivotedly mounted on an axle 2 on wheels 3 and 4. Motion is transmitted from the axle 2 to the rearwardly extending shaft 5 by means of conventional gearing (not shown) in the casing 6. Conventional shifting gears (not shown) in the casing 7 operated by shift lever 8 is provided for variation in speed of the shaft 5. Any other suitable means may be used for varying the speed of the shaft 5. It will be evident that means for varying the speed of the shaft 5 is not absolutely necessary for carrying out the spirit of my invention. A sprocket gear 9 is fixedly mounted on the end of the shaft 5 and meshes with a chain 10 engaging a sprocket gear 11 on the shaft 12 mounted in a gear casing 13 formed as an integral part of the rear underside of the digging blade 14. Motion is transmitted to a series of gears 15 mounted on shafts 16 by sprocket chains 17. The blade 14 has upwardly extending sides 18 for directing the earth and potatoes rearwardly thereof. The forward edges 19 of the upwardly extending sides 18 extend considerably forward of the forward cutting edge of the blade 14. It will be evident that any form of weed cutters (not shown) may be disposed on the sides 18 of the blade 14 such as rotating discs.

A series of open helically wound rods 20 are fixedly connected to the shafts 16 journaled in the gear box 13 and they are rotated upon forward motion of the machine. A suitable form of covering 21, such as a rubber composition cover, is preferably disposed on the rods 20. An upwardly extending casing 22 encloses the sprocket chain 10 and it is also utilized as a means of securing the blade 14 to the frame 1. The lower end of the casing 22 is secured by welding or any other suitable means to flanges 23 secured to the blade 14 and the upper end of the casing 22 is secured by welding or any other suitable means to the tiltable housing 24 which houses the rearwardly extending shaft 5. The housing 24 has outwardly extending bolt members 25 which extend through apertures 26 in the frame 1 and the housing 24 is secured to the frame 1 by nuts 27. An arm 28 is secured to the side of the housing 24 and has an arcuate shaped aperture 29 through which extends a screw bolt 30 for securing the arm 29 at different angular positions with respect to the frame 1 in order that the angle of the blade 14 with respect to the earth may be varied within predetermined limits. A turn buckle connection 31 between the frame 1 and the rear portion of the blade 14 gives the blade 14 further support. Any other suitable means may be used in place of the turn buckle 31. A V-shaped portion 32 of the frame 1 extends upwardly at approximately a forty-five degree angle and the forward ends 33 thereof are flanged in parallel relationship to receive a center connecting member 34 therebetween. A freely pivoted draw bar 35 of substantially V-shape is connected to the frame 1 at 36 and to the draw bar 37 of a tractor at 38. A cross member 39 is secured to flanges 40 on the inner side of the V-shaped draw bar 35, and a freely rotatable threaded shaft 41 is mounted and secured thereon. The threaded shaft 41 passes through a threaded aperture 42 in the center connecting member 34 and a handle 43 is fixed to the upper end thereof. Movement of the handle 43 rotates the shaft 41 moving the V-shaped portion 32 of the frame 1 toward or away from the V-shaped draw bar 35 in accordance with the direction of the rotation of the handle 43.

In operation, the V-shaped draw bar 35 is connected to the draw bar 37 of a tractor and the machine is lined up with the wheels thereof straddling a row of potatoes. Rotation of the handle 43 in a counterclockwise direction causes the movement of the V-shaped portion 32 of the frame 1 upwardly and away from the V-shaped draw bar 35, thereby moving the blade 14 secured to the rear portion of the frame 1 into the earth. The forward movement of the machine causes rotation of the axle 2 and rotation of the shaft 5 through differential gears (not shown) in the gear casing 6. The shift lever 8 is used to obtain the speed of the shaft 5 desired. The motion of the shaft 5 is transmitted to the shaft 12 through sprocket gears 9 and 11 and the sprocket chain 10. Motion is transmitted from the shaft 12 upon which the sprocket gear 11 is mounted to the series of shafts 16 through sprocket gears 15 and sprocket chains 10. The gears and sprocket chains 10, 11, 15 and 17 operate in oil and they are fully enclosed, thereby making the operation very efficient with a minimum amount of wear. The rotation of the shafts 16 causes the rotation of the open helically wound rods 20 connected thereto. Upon the earth containing the potatoes passing over the blade 14, they come in contact with the power rotated open helically wound rods 20, wherein the potatoes are gently forced upwardly through the soil and left laying in a well defined row behind the machine. The angle of the blade 14 with respect to the earth may be varied by loosening bolt 30 and the turn buckle connection 31 and moving it to the desired position whereupon the bolt 30 again is drawn up and the turn buckle connection 31 is tightened. When it is desired to remove the blade 14 from the earth, the handle 43 is turned in a clockwise direction to move the forward V-shaped portion 32 of the frame 1 toward the V-shaped draw bar 35, thereby raising the rear portion of the frame 1 and the blade 14 connected thereto.

Fig. 6 is a modified form of means for raising and lowering the blade into and out of the earth. A lever 50 is pivotally connected to a draw bar 51 at 52 and is connected to the upwardly extending V-shaped portion 53 of the frame 54 by a connecting member 55. A spring 56 urges the V-shaped forward portion 53 of the frame 54 towards the draw bar 51. An arcuate member 57 having a plurality of notches 58 is secured to the draw bar 51 and engages the side of the lever 50. A detent 58a movable in an outwardly extending portion 59 on the lever 50 engages the notches 58 in the arcuate member 57. The detent 58a is moved longitudinally of the lever 50 into and out of engagement with the notches 58 in the arcuate member 57 by a wire 59 connected to the detent 58a and to a spring-urged pivotally mounted gripping lever 60 on the upper portion of the operating lever 50. In this modification, the gripping lever 60 is forced inwardly and the detent 58a is removed from a notch 58 in the arcuate member 57, and it is moved to any other notch 58 desired, thereby causing the V-shaped portion 53 of the frame 54 to move toward or away from the draw bar 51, moving the rear portion of the frame 54 and the blade attached thereto into and out of the earth. Although I have shown both sides of the rear portion of the frame 1 extending to a parallel position on one side of the blade, it will be evident that the blade may be supported on both sides thereof without departing from the spirit of my invention.

Fig. 7 shows another modified form of my novel potato digging machine with the machine connected directly on the draw bar 70 of a tractor. Motion is transmitted from the tractor to the helically wound rods 71 through the directly connected shaft 72, shift lever gears (not shown) in the shift lever casing 73 and shaft 74 and through sprockets, sprocket chains and gears as shown in Fig. 1. Supporting members 75 support the vertically extending casing 76, blade 77, and gear box 78. Supporting members 75 are pivoted on a shaft 79 carried by U-shaped member 80 secured to the draw bar 70 of the tractor by bolts 81. A vertically extending freely rotatable screw member 82 having a handle 83 engages a threaded portion 84 on the forward end of the supporting member 75 to raise and lower the blade 77, attached to the supporting member 75. Hand screws 86 passing through internally threaded ears 87 integrally formed on the supporting member 75 permit the vertically extending housing 76, and the leg 77 attached thereto to be adjusted in a forward or a rearward direction, thereby varying the angle of the blade with respect to the supporting member 75 and with further respect to the earth. The housing 76 pivots on shaft 88.

Figure 9:
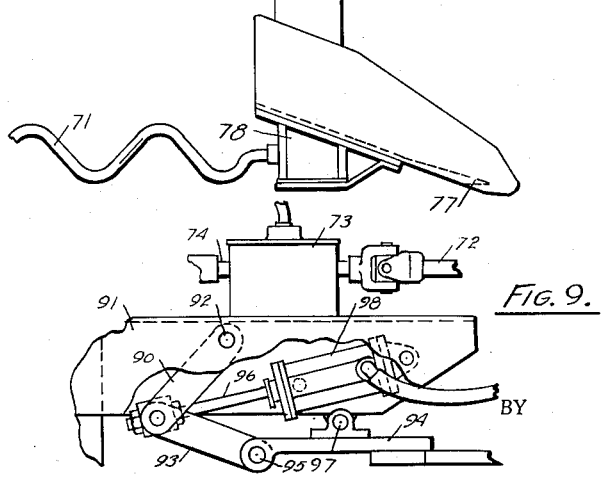
Fig. 9 is a fragmentary side elevational view showing power means for raising and lowering the digging blade.

Power means for raising and lowering the blade is shown in Fig. 9. Link member 90 pivoted on the supporting member 91 at 92 and link member 93 pivoted on a supporting member 94 at 95 each connect to a plunger 96 operated hydraulically or by any other suitable means. The supporting member 91 is pivoted at 97. It will be evident that when the plunger is drawn inwardly in the cylinder 98, the link members 90 and 93 force supporting member 91 upwardly, thereby removing the blade (not shown) attached thereto upwardly and out of the ground. When the plunger 96 moves outwardly, the supporting member 91 is lowered and the blade (not shown) attached thereto is lowered into the ground. Any suitable means may be used such as vacuum, exhaust, compressed air, or hydraulic means for raising and lowering the blade.

It will be evident from the foregoing that I have provided a potato digging machine which removes the potatoes from the earth without bruising them in any manner, which has all moving parts fully protected, and which leaves the dug potatoes in a well defined row behind the machine.

Any form of gearing or other means may be used to transmit motion from the axle to the open helically wound rods 20 without departing from the spirit of my invention. It will further be apparent that my machine may be directly connected to the power take-off shaft of the tractor engine and likewise it may be mounted directly on the rear portion of the tractor without departing from the spirit of my invention.

Various changes may be made in the specific embodiment of the present invention without departing from the spirit thereof or from the scope of the appended claims.

What I claim is:

1. In a digging machine for root crops having, in combination, a frame, a blade carried by said frame, a gear box integral with the underside of said blade, shafts mounted in said gear box, means for rotating said shafts, and cantilever mounted open helically wound rods connected to said shafts in a substantially horizontal plane adapted to operate below the surface of the earth when said blade is in operative position.

2. In a digging machine for root crops having, in combination, a frame, an axle for pivotally mounting said frame, wheels on said axle, a draw bar connected to said frame, a blade connected to the rear portion of said frame, shafts mounted in the rear portion of said blade, means for transmitting motion from said axle to said shafts, cantilever mounted open helically wound rods connected to said shafts and rotatable therewith disposed rearwardly in substantially a horizontal plane from said blade adapted to operate below the surface of the earth, and means for moving the forward portion of said frame relative to said draw bar to raise and lower said blade.

3. In a digging machine for root crops having, in combination, a frame having a V-shaped portion offset upwardly in a horizontal plane, an axle for pivotally mounting said frame, a substantially V-shaped draw bar pivotally connected to said frame, a blade connected to the rear portion of said frame, cantilever mounted open helically wound rods disposed rearwardly in substantially a horizontal plane from said blade adapted to operate below the surface of the earth, means for transmitting motion from said axle to said open helically wound rods, and means for moving the forward V-shaped portion of said frame relative to said V-shaped draw bar to raise and lower said blade.

4. A digging machine for root crops having, in combination, a frame with the forward end thereof offset upwardly in a horizontal plane, an axle for pivotally mounting said frame, wheels on said axle, a draw bar pivotally connected to said frame, a blade connected to the rear portion of said frame, a gear box on the underside of said blade, shafts mounted in said gear box, means for transmitting motion from said axle to said shafts for rotating said shafts, cantilever mounted open helically wound rods connected to said shafts and rotatable therewith disposed rearwardly of said blade adapted to operate below the surface of the earth, and means for moving the forward offset portion of said frame relative to said draw bar to raise and lower said blade.

5. A digging machine as set forth in claim 4 wherein means are provided for adjusting the angle of said blade with respect to the earth.

6. In a machine of the class described, in combination, a tiltable frame, means for tilting said frame, a blade secured to the rear portion of said frame, cantilever mounted open helically wound rods disposed rearwardly of said blade in a substantially horizontal plane adapted to rotate below the surface of the earth, and means for rotating said helically wound rods.

7. In a machine of the class described, in combination, a tiltable frame, means for tilting said frame, a blade pivotally secured to the rear portion of said frame, adjustable means for securing said blade at different angles with respect to said frame, cantilever mounted open helically wound rods disposed rearwardly in substantially a horizontal plane from said blade adapted to operate below the surface of the earth, and means for rotating said helically wound rods.

8. In a machine of the class described, in combination, a tiltable frame, means for tilting said frame, a blade having sides extending forwardly thereof secured to said frame, means for varying the angle of said blade with respect to said frame, cantilever mounted open helically wound rods disposed rearwardly in substantially a horizontal plane from said blade adapted to operate below the surface of the earth, and means for rotating said rods.

9. In a machine of the class described, in combination, a frame, a blade secured to said frame, cantilever mounted open helically wound rods disposed rearwardly in substantially a horizontal plane from said blade adapted to operate below the surface of the earth, means for rotating said rods, and means for raising and lowering said blade.

10. A machine as set forth in claim 9 wherein means are provided for varying the angle of said blade with respect to said frame.

11. In a digging machine for root crops having in combination a blade, a plurality of cantilever mounted open, helically-wound rods disposed rearwardly of said blade and in substantially the same horizontal plane as the forward cutting edge of said blade, and means for rotating said rods.

EBON B. BOWER.